United States Patent [19]
Jones

[11] 3,878,899
[45] Apr. 22, 1975

[54] LAWN CULTIVATOR

[76] Inventor: Richard M. Jones, 273 Pimlico Way, Saginaw, Tex. 76079

[22] Filed: May 31, 1973

[21] Appl. No.: 365,569

Related U.S. Application Data

[63] Continuation-in-part of Ser. No. 228,575, Feb. 23, 1972, abandoned.

[52] U.S. Cl. .................................. 172/21; 172/61
[51] Int. Cl. ........................................ A01b 45/02
[58] Field of Search ............. 172/21, 22, 42, 43, 61, 172/62, 84, 85, 96, 118

[56] References Cited
UNITED STATES PATENTS

| | | | |
|---|---|---|---|
| 321,919 | 7/1885 | Stone | 172/62 |
| 357,841 | 2/1887 | Lubin | 172/84 X |
| 396,441 | 1/1889 | Taylor | 172/62 X |
| 1,124,534 | 1/1915 | Schmitt | 172/61 |
| 1,853,079 | 4/1932 | Plant | 172/21 X |
| 2,302,944 | 11/1942 | Helbig | 172/21 |
| 3,204,703 | 9/1965 | Hansen | 172/84 X |
| 3,414,063 | 12/1968 | Kuhlman | 172/21 |

*Primary Examiner*—Edgar S. Burr
*Assistant Examiner*—Paul T. Sewell
*Attorney, Agent, or Firm*—Wofford, Felsman, Fails & Zobal

[57] ABSTRACT

The specification discloses a lawn cultivator comprising a mobile frame and a plurality of spaced arms carried by the frame, each arm having a spike pivotally coupled to a forward end thereof. Each arm is mounted for pivotal movement about a shaft such that the forward end of each arm may be pivoted downward to move its spike downward and into the ground and pivoted upward to move the spike upward from the ground. Separate springs are coupled to the rear of each arm for normally biasing its forward end in the downward direction. A cam shaft is carried by the frame and has a plurality of cams spaced along the length thereof and at different angular positions around the shaft. Each cam is associated with the rear end of one arm and the cam shaft is driven such that the cams sequentially engage the rear ends of the arms to raise their forward ends against the force of the springs and sequentially release the arms to allow their springs to force their forward ends downward to drive their spikes into the ground.

4 Claims, 9 Drawing Figures

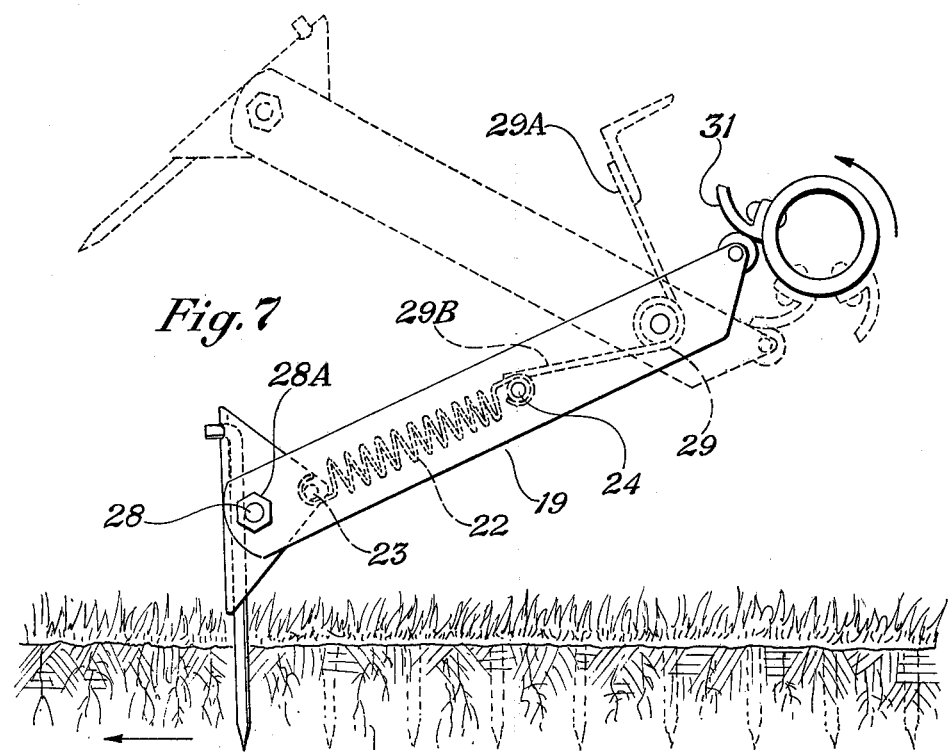
Fig. 7
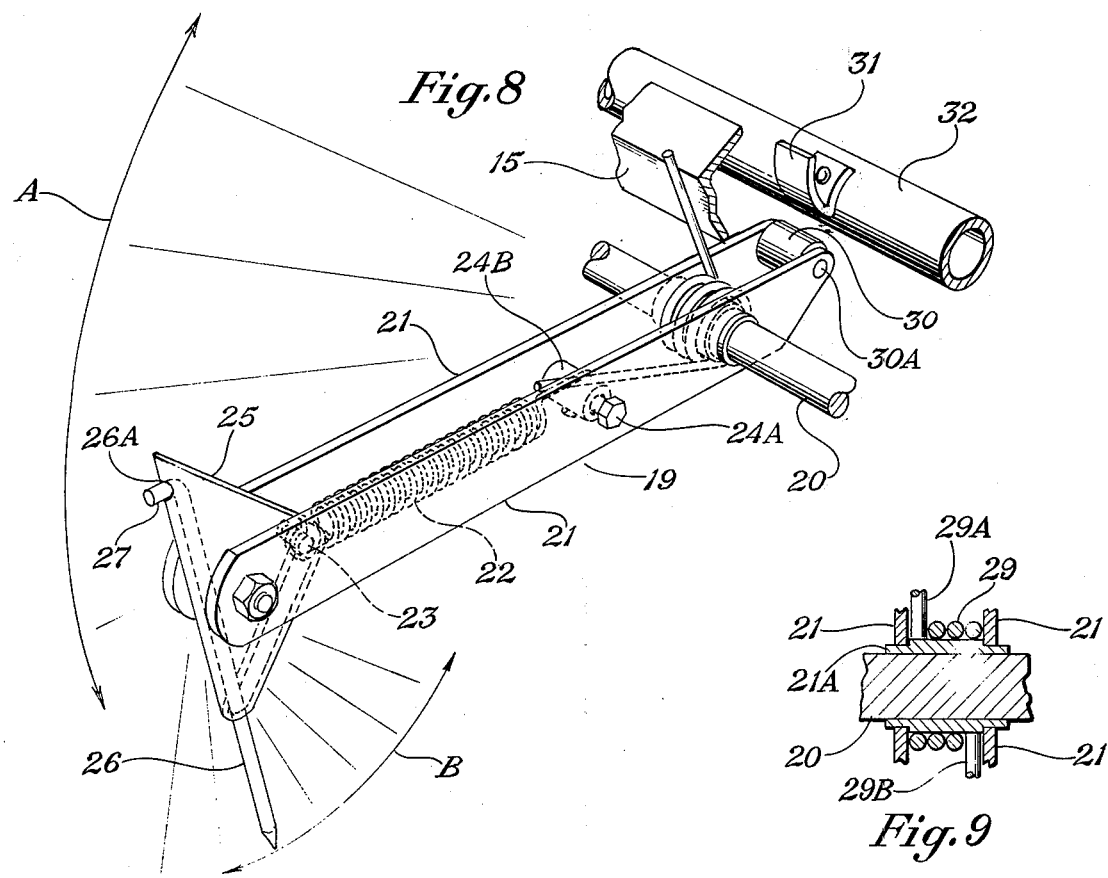
Fig. 8
Fig. 9

LAWN CULTIVATOR

This application is a continuation-in-part of U.S. Patent Application Ser. No. 228,575, filed by Richard M. Jones on Feb. 23, 1972, now abandoned.

BACKGROUND OF THE INVENTION

This invention relates to a cultivator and more particularly to an improved and lightweight lawn cultivator for loosening the earth.

Lawn cultivators have been proposed or built and which employ a plurality of arms, having spikes which are driven into the ground for loosening the earth. These cultivators however, have disadvantages, in that either all of the spikes are driven into the ground at the same time or else the arms are sequentially moved to drive their spikes into the ground with a crank type arrangement wherein all of the arms are coupled to the crank and continuously follow the crank as it rotates and hence are in motion continuously and at the same time. In the former embodiment, the cultivator tends to "hop" and hence requires a large amount of weight to hold it down and to reduce vibration while in the latter embodiment, the crank absorbs a large amount of the downward force applied to the arms and hence to the spikes. In addition, large amount of vibration is experienced thereby requiring additional weight to reduce the vibration.

SUMMARY OF THE INVENTION

In accordance with the present invention, there is provided an improved cultivator which employs means to apply a large amount of force to drive its spikes into the ground without imparting undesired vibrations or "hop" to the cultivator thereby eliminating the necessity of undesired weight.

The cultivator comprises a mobile frame and a plurality of spaced arm means carried by the frame, each arm means having a spike coupled to a first end thereof. Each arm means is mounted for pivotal movement about a pivot axis such that the first end of each arm means may be pivoted downward to move its spike downward and into the ground and pivoted upward to move its spike upward from the ground. Biasing means is coupled to each arm means for normally biasing each arm means to normally bias its first end in a downward direction. In addition, means is provided for sequentially moving each arm means to move the first end of each arm means upward against the force of the biasing means for sequentially releasing each arm means to allow the biasing means to force the first end of each arm means downward to drive its spike into the ground.

In the embodiment disclosed, the means for sequentially moving and releasing the arm means comprises a cam shaft carried by the frame and having a plurality of cam means spaced along the length thereof and at different angular positions around the shaft. Each cam means is associated with one of the arm means. In addition, power means is provided for rotating the cam shaft in a given direction. The cam shaft is located to allow each cam means to move the first end of its associated arm means upward against the force of the biasing means and then to release its arm means as the cam shaft is rotated in said given direction to allow said biasing means to force the first end of each arm means downward to drive its spike into the ground. With this arrangement, each arm means is sequentially raised against the force of the biasing means and then tripped to allow the biasing means to force the first end of the arm means downward thereby applying a large amount of force to each spike to drive it into the ground while at the same time minimizing vibration and hop and hence eliminating the necessity of a large amount of weight.

In a further aspect, each spike is pivotally coupled to the first end of its arm means and is normally biased in a given position relative to its arm means. With this arrangement, a spike when driven into the ground will not halt the cultivator since the spike may pivot relative to its arm thereby allowing the cultivator to be moved continuously as it is being operated.

BRIEF DESCRIPTION OF THE DRAWINGS

FIG. 7 is a side view of one of the arms of the cultivator and the cam shaft illustrating its manner of operation;

FIG. 8 is a perspective view of the arm and cam shaft of FIG. 7 ; and

FIG. 9 is a cross-sectional view illustrating the manner in which an arm is mounted for pivotal movement.

DETAILED DESCRIPTION OF THE INVENTION

Figure 1:
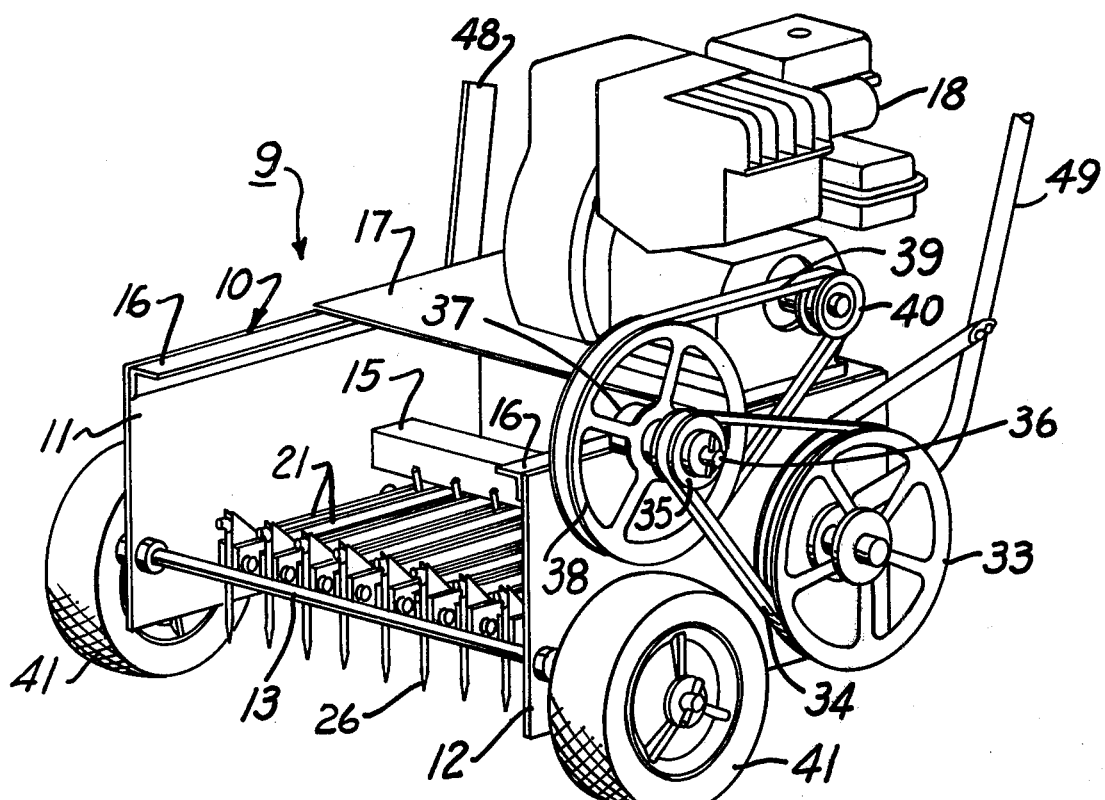
FIG. 1 is a perspective view of the cultivator of the present invention.
Figure 3:
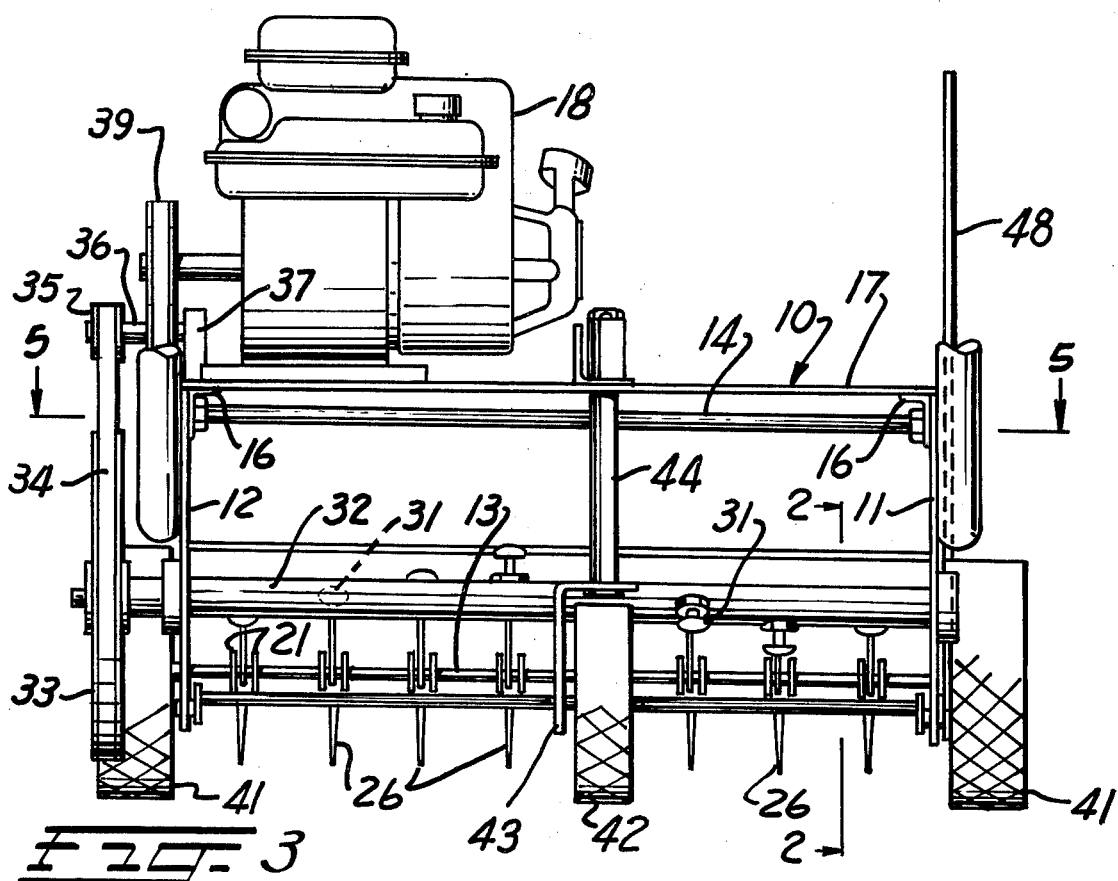
FIG. 3 is a back end view of the cultivator.

Referring now to the drawings, the cultivator is identified by reference numeral 9. As seen in FIGS. 1 and 3, the cultivator 9 comprises a mobile frame 10 formed by two vertically disposed and rectangular steel end plates 11 and 12 that are held in equal and parallel spaced relation to each other by means of a front tie rod 13 and a back tie rod 14. The ends of each tie rod are provided with threads on which are screwed nuts or the like since the ends of the tie rods project through openings in the aforesaid end plates. An angle iron 15 is also located between the two end plates 11 and 12 to which the angle iron is secured by any desired means for reasons of structural stability. The upper longitudinal edge of each of the two aforesaid end plates 11 and 12 is provided with an angle iron 16 which is located on the inside surface of the above mentioned end plates for the support of a rectangular support plate 17 on which an internal combustion engine 18 is mounted.

Referring now to FIGS. 2, 5, 7, and 8 of the drawings, the cultivator comprises a plurality of spaced arms 19 that are mounted for pivotal movement on a laterally disposed round bar or shaft 20 that is mounted between and secured at each end to the two aforesaid end plates 11 and 12. Each arm 19 is formed by two equally spaced and parallel rectangular steel bars 21. As illustrated in FIG. 9, the bars 21 of each arm 19 are mounted for pivotal movement on the shaft 20 by way of a cylindrical bearing illustrated at 21A. In FIG. 8, the arc through which an arm 19 may pivot or swing is illustrated by line A.

A triangularly shaped spike support head 25 is pivotally mounted between the front ends of the steel bars 21 of each arm 19 for the support of a spike 26 which has a lower pointed end for penetrating the ground and an upper transverse end 27. The spike support head 25 is U-shaped when viewed from the top and is provided with an opening 26A in the front end thereof. The spike 26 is located in the bite of the U of head 25 and in front of a bolt 28 with the transverse end 27 projecting through aperture 26A. With this arrangement, the spike 26 is securely held by the head 25 for cultivating purposes and yet may be readily removed for repair purposes by removing nut 28A and bolt 28. The head 25 is pivotally supported between the two steel bars 21 of each arm 19 by the bolt 28 which extends through bars 21 and head 25 and is held in place by the nut 28A. With this arrangement, the head 25 and hence its spike 26 may pivot or swing through an arc illustrated by line B in FIG. 8.

A coil spring 22 is secured under tension to a pin 23 connected to head 25 and a pin 24 connected between bars 21 of arm 19. The purpose of the spring 22 is to normally bias the head 25 and hence the spike 26 in the position relative to the arm 19 as illustrated in FIG. 7 to allow the spike 26 to penetrate the ground at a desired angle when the arm 19 is forced or swung downward. The spring 22, however, allows the head 25 and hence the spike 26 to pivot in the direction of the arrows in line B relative to the arm 19 when the spike has penetrated the ground and the cultivator is moving in a forward or rearward direction. As illustrated, pin 23 extends between the triangularly shaped sides of the head 25 at the apex thereof. As shown in FIG. 8, pin 24 comprises a bolt 24A extending through bars 21 of arms 19 and through a cylindrical member 24B located between bars 21. The rear end of spring 22 is hooked around cylindrical member 24B which along with bolt 24A also acts to space the forward ends of bars 21 apart to allow pivoting action of the head 25.

Coiled around bearing 21A and hence around shaft 20 within the bars 21 of each arm 19 is a spring 29 having two arms 29A and 29B which are urged apart by the action of the spring. Arm 29A engages the lower edge of fixed angle iron 15 while arm 29B engages the top portion of pin 24 and hence the top portion of cylinder 24B. Spring 29 thus spring-loads or biases the forward end of arm 19 in the downward direction. When the arm 19 is raised against the force of the spring 29, spring 29 is coiled tighter such that a large downward force is applied against the arm 19. When the arm 19 is tripped or released from the raised position, this force drives the arm 19 downward and hence drives its spike 26 into the ground.

Figure 2:
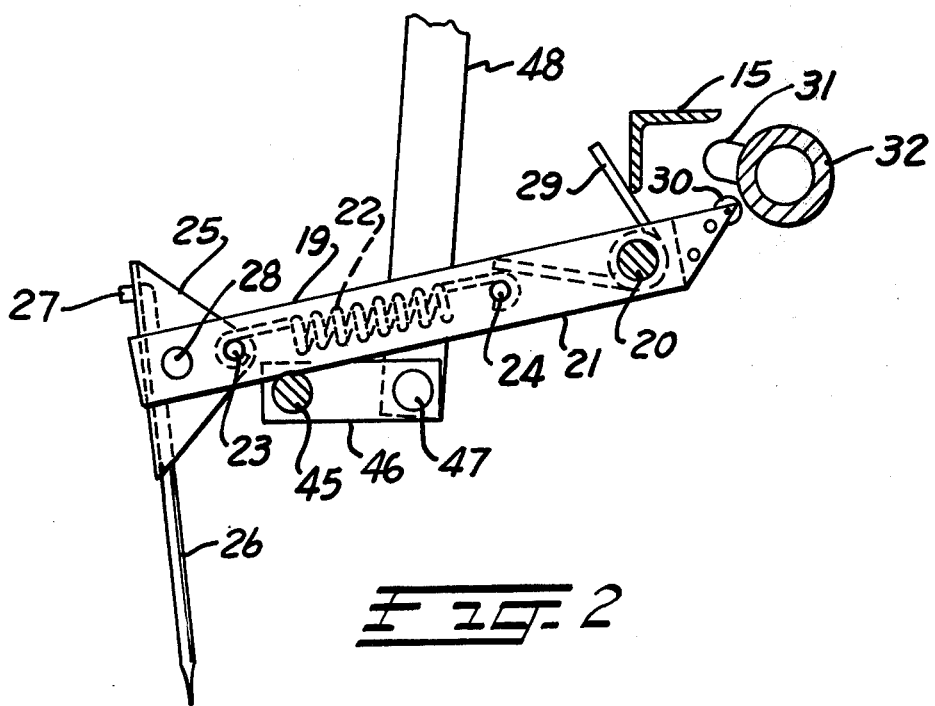
FIG. 2 is a sectional view of the cultivator, taken substantially along the vertically disposed line 2—2 of FIG. 3, and viewed in the direction indicated by the arrows and illustrating one of the arms and the cam shaft for controlling the arm.

Referring to FIGS. 2, 7, and 8, the mechanism for raising and releasing each arm 19 comprises a laterally disposed cam shaft or tube 32 having mounted thereto a plurality of cams 31 spaced along its length and at different angular positions around the shaft 32. A cam 31 is associated with each arm 19. Secured to the rear end of arm 19 is a free-turning roller 30 supported for rotation between bars 21 by a pin 30A. The cam shaft 32 is located between end plates 11 and 12 of the frame and is supported for rotation by end plates 11 and 12 and suitable bearings. Power means comprising engine 18 and a pulley arrangement is provided for rotating the cam shaft in the couterclockwise direction as viewed in FIGS. 2, 7, and 8. The cam shaft 32 is located such that each cam 31 will contact and engage its associated roller 30 as the cam shaft is rotated and force the roller 30 and hence the rear end of its arm 19 downward thereby raising the front end of the arm 19 against the force of spring 29. As the cam shaft 32 continues to rotate, the cam 31 will be rotated past the roller 30 and hence will trip or release the arm 19 to allow the spring 29 to snap or drive the front end of arm 19 downward thereby driving its spike 26 into the ground. As the cam shaft 32 continues to rotate around, cam 31 will again engage roller 30 to raise the front end of arm 19 to remove the spike 26 from the ground. The cycle will be repeated for each revolution of cam shaft 32.

Figure 6:
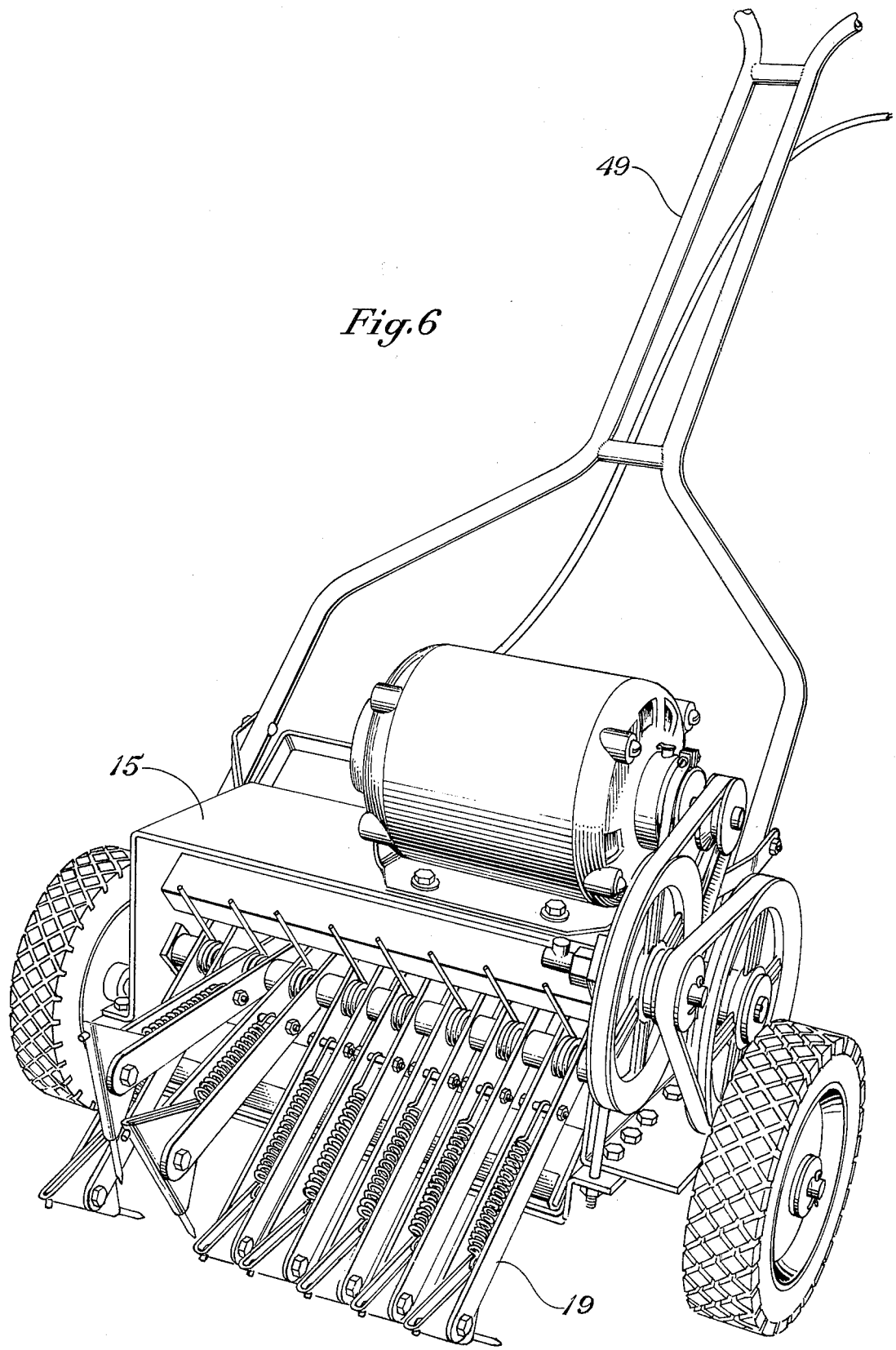
FIG. 6 is another perspective view of the cultivator having a modified frame, power means, and clutch.

Each of the arms 19 is constructed in the same manner and each has a cam 31 for raising and releasing the arm. Cams 31, however, are spirally located around the cam shaft 32 at different angular positions as indicated above, whereby only two or three of the cams 31 will engage their arms at the same time. Thus only two or three of arms 19 will be moving or working at the same time as illustrated in FIG. 6, thereby eliminating hop to the cultivator and minimizing vibration and hence the requirement of a large amount of weight to stabilize the cultivator. Moreover, since the arms 19 are moved upward and then tripped or released, the full force of the springs 29 is applied to snap or drive their arms 19 downward. In addition, since the heads 25 may pivot relative to the arms 19, the spikes 26 will not halt or stop the cultivator from continuously moving forward or rearward when they are driven into the ground which otherwise would occur for example if the spikes were fixed in place relative to the arms 19. In this respect, when a spike 26 is driven into the ground, forward movement of the cultivator for example, will cause the spike 26 to pivot in the counterclockwise direction as seen in FIG. 7 as its arm 19 is moved forward thereby allowing continual forward movement of the cultivator. As the cam shaft 32 continues to rotate and the cycle is completed, the arm 19 will be lifted or raised again for another cycle. If the cultivator is being moved rearward, a spike 26, when in the ground, will be allowed to pivot in the clockwise direction to allow continual rearward movement of the cultivator.

Figure 4:
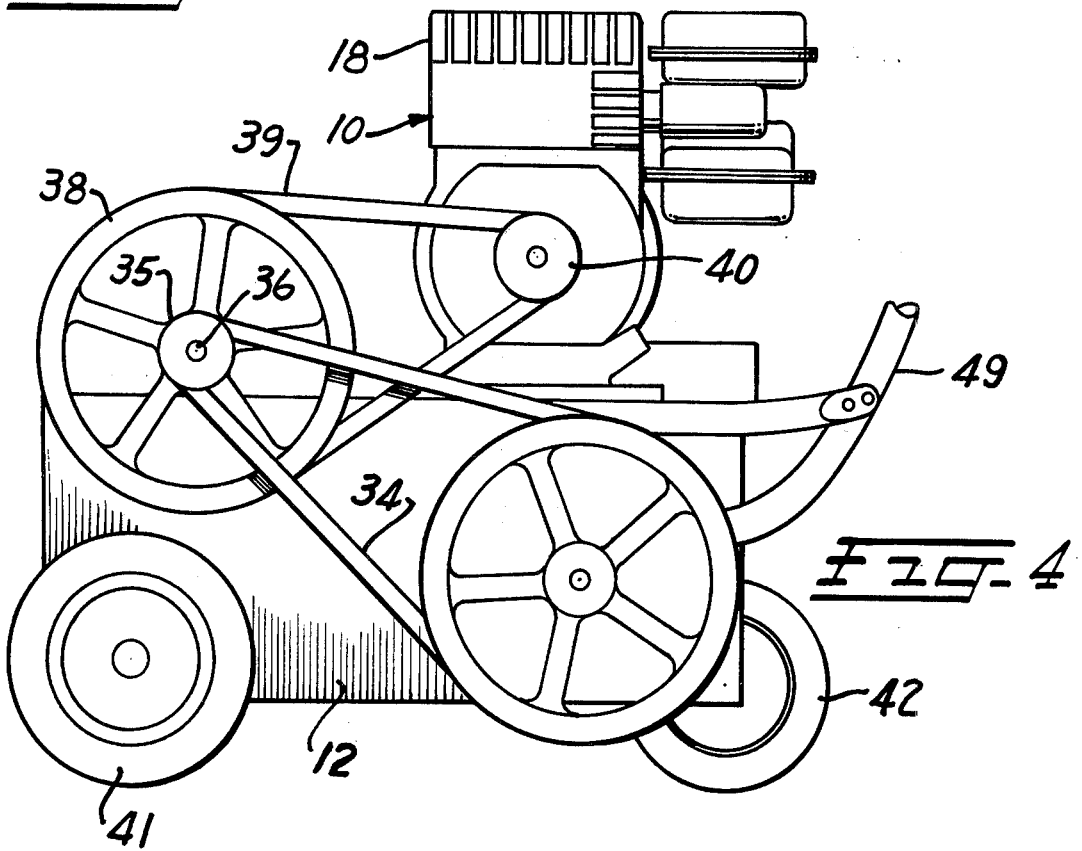
FIG. 4 is a side view of the cultivator.
Figure 5:
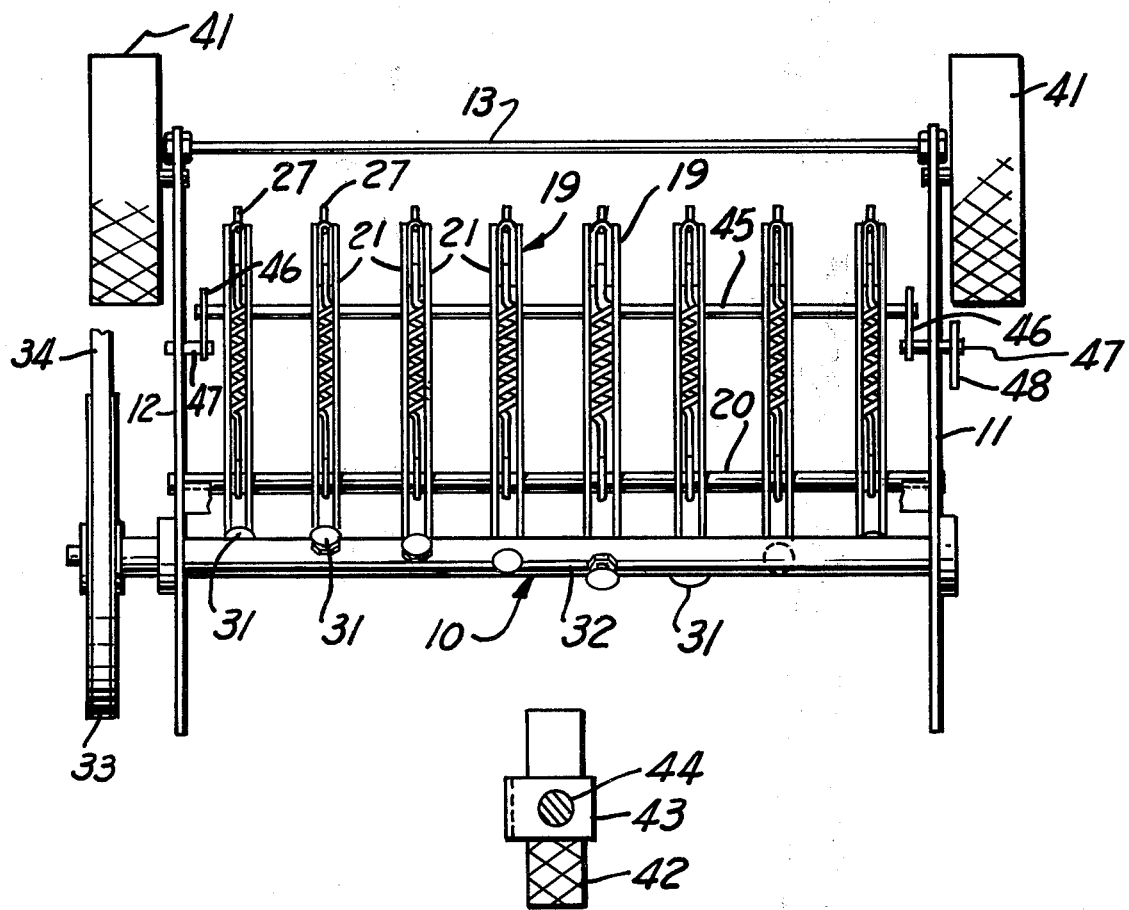
FIG. 5 is a sectional view of the cultivator, taken substantially along the horizontally disposed line 5—5 of FIG. 3, and viewed in the direction indicated by the arrows.

Referring now to FIGS. 1, 3, 4, and 5, there will be described the power means for rotating the cam shaft 32. The cam shaft 32 has its left end (as seen in FIG. 4 and 5) projecting through the left end plate 12 and has connected thereto, outside of the end plate 12, a pulley 33. A belt 34 is coupled to pulley 33 and also to a small pulley 35 that is mounted on the outer end of a stub shaft 36. Shaft 36 is supported by a pulley block 37 connected to the top of the angle iron 16 which is connected to end plate 12. Stub shaft 36 supports an intermediate pulley 38. A belt 39 is coupled to pulley 38 and also to a pulley 40 of the internal combustion engine 18, thereby providing means for rotating the cam shaft. The power means of the cultivator of FIG. 6 is similar except that an electric motor is employed as a power source instead of an internal combustion engine.

The frame of the cultivator is supported for movement by three wheels, two front wheels 41 that are mounted to end plates 11 and 12 and a single centrally located rear wheel 42. As seen in FIG. 3, rear wheel 42 is supported by an inverted L-shaped wheel support bracket 43 and a vertically disposed round bar 44 that is secured to the rear of support plate 17. Since the cultivator is relatively light, it may be easily pushed or pulled manually, by use of a handle 49, although if desired, a power drive, driven by the engine or motor 18 may be employed.

The clutch for the embodiment of FIG. 1–5 comprises a rod 45 that extends laterally below the arms 19 between end plates 11 and 12 and which is suitably secured to the two levers 46. Levers 46 are fixedly secured to pins 47 which extend through and pivot in end plates 11 and 12 respectively. The pin 47 on the right as seen in FIG. 5 is fixedly secured to a hand lever 48. When the cultivator is not in use, the lever 48 may be pulled backward and downward to pivot the levers 46 to a generally vertical position thereby raising the rod 45 to raise the arms 19 and hence their spikes 26 out of contact with the ground. In order to activate or place the arms 19 in a position for use, the lever 48 will be located in a generally vertical position to lower the bar 45 below and out of contact with the arms 19.

In the embodiment disclosed, eight arms 19 are employed and hence eight cams 31 are connected spirally around the shaft 32. The cams 31 are spaced about 1½ inches apart along the length of the shaft 32. The shaft 32 has a diameter of 1 1/16 of an inch and the eight cams 31 make nearly one complete spiral around the cam shaft 32 along its length from one end to the other. If desired, the cams 31 may make a complete spiral around the cam shaft along its length. The spikes 26 in one embodiment may have a length of about 2 inches.

I claim:

1. A cultivator comprising:
   a mobile frame,
   a plurality of spaced arm means carried by said frame, each having a first end and a second end,
   a head means pivotally coupled to the first end of each arm means,
   a spike coupled to each head means,
   head spring means coupled between each head means and its arm means for normally biasing each head means and hence each spike in a given position relative to its arm means,
   each arm means being mounted for pivotal movement about a pivot shaft carried by said frame such that the first end of each arm means may be pivoted downward to move its spike into the ground and pivoted upward to move its spike upward from the ground,
   separate arm spring means coupled to each arm means for normally biasing each arm means to normally bias its first end in the downward direction,
   a cam shaft carried by said frame and having a plurality of cam means spaced along the length thereof and at different angular positions around said cam shaft,
   each cam means being associated with one of said arm means,
   power means for rotating said cam shaft in a given direction,
   said cam shaft being located to allow each cam means to engage the second end of its associated arm means to move said second end downward and hence its first end upward against the force of its arm spring means and then to release the second end of its associated arm means as said cam shaft is rotated in said given direction to allow said arm spring means to force the first end of said arm means downward to drive its spike into the ground.

2. The cultivator of claim 1 wherein each arm spring means comprises:
   a coil spring located around said pivot shaft and coupled to its arm means and to structure carried by each frame.

3. The cultivator of claim 1 wherein:
   each head means is pivotally coupled to its arm means in a manner to allow each head means and hence its spike to pivot through angular positions on opposite sides of said given position in which each head means and hence its spike is normally biased.

4. The cultivator of claim 3 wherein:
   each arm means comprises a pair of spaced bars having first ends and second ends,
   the second ends of each pair of bars being pivotally coupled to said pivot shaft,
   a roller secured between the second ends of each pair of bars rearward of said pivot shaft for engagement by the associated cam means as said cam shaft rotates,
   each arm spring means comprises a coil spring located around said pivot shaft between each pair of spaced bars of said arm means,
   each coil spring having one end in engagement with structure carried by said frame and one end in engagement with its associated arm means for urging its associated arm means downward,
   each head means comprises a U-shaped member pivotally coupled by pivot means between the first ends of the pair of bars of its associated arm means with the U located in a position forward of the pivot means,
   each of said pivot means being removable to allow its head means to be removed,
   each spike comprises an elongated member having a pointed end and a transverse portion at its other end,
   each spike being removably located within the U of its head means in front of the pivot means of its head means with its pointed end extending downward and its transverse portion extending through an aperture formed through the U of its head means,
   each head spring means has one end coupled to its heand means and an opposite end coupled to its arm means at a position rearward of the head means.

* * * * *